United States Patent Office 2,885,427
Patented May 5, 1959

2,885,427

FLUORINATION OF TRICHLOROETHYLENE

Robert P. Ruh and Ralph A. Davis, Midland, and Max R. Broadworth, Bay City, Mich., assignors to The Dow Chemical Company, Midland, Mich., a corporation of Delaware No Drawing. Application November 15, 1956
Serial No. 622,271

9 Claims. (Cl. 260—653.7)

The invention relates to the fluorination of trihaloethylenes and is more particularly concerned with the fluorination of trichloroethylene directly with hydrogen fluoride.

Many attempts to fluorinate trichloroethylene directly with hydrogen fluoride have been made. Researchers have also used various fluorination promoters in an attempt to cause its fluorination with hydrogen fluoride. While Harmon in U. S. Patent 2,399,024 is able to accomplish some fluorination of trichloroethylene at a temperature of about 200 degrees centigrade under high pressure his yields were only 1,2-dichloro-1,1-difluoroethane, and he does not report any 1,1,1-trifluoro-compounds formed. Further, Henne et al., J.A.C.S., 65, 1271 (1943), report that trichloroethylene, even at 160 degrees centigrade does not fluorinate. Henne et al., J.A.C.S., 70, 758 (1948), again report that trichloroethylene does not react with hydrogen fluoride at 160 degrees centigrade, but in the presence of boron trifluoride, a fluorination catalyst, prepares 1,1,2-trichloro-1-fluoroethane, $$CH_2ClCCl_2F$$

and 1,2-dichloro-1,1-difluoroethane, $CH_2ClCClF_2$. Additionally, Henne, Organic Reactions, II, page 56 (1944) reports that $CH_2Cl$ groups are not fluorinated, especially when fluorine atoms are on adjacent carbon atoms. No method has been successfully used to accomplish the fluorination of trichloroethylene to prepare a 1,1,1-trifluoro-2-haloethane.

It is a principal object of the present invention to obtain the fluorination of trichloroethylene directly with hydrogen fluoride to prepare a 1,1,1-trifluoro-2-haloethane material. Still another object of the present invention is to accomplish the fluorination of a $CH_2Cl$ group adjacent to a $CF_3$ group. Another object of the present invention is to provide a new chemical compound, 1,1,1,2-tetrafluoroethane. A further object of the present invention is to provide a fluorination technique for fluorinating trichloroethylene or 1,1-dichloro-2-bromoethylene with hydrogen fluoride, in the presence of a particular catalyst, without requiring regular replenishment of the catalyst. Other objects will become apparent hereinafter.

The foregoing additional objects are accomplished by fluorinating trichloroethylene or 1,1-dichloro-2-bromoethylene over an improved catalyst. This improved catalyst is believed to be a basic chromium fluoride catalyst, prepared by heating a hydrated chromium fluoride to a temperature in the range of about 350 degrees centigrade to about 750 degrees centigrade, in the presence of oxygen. By such treatment, the hydrated chromium fluoride is at least partially converted to a basic chromium fluoride. The catalyst is known to the art and is completely described in Patent 2,745,886, as well as certain pending applications.

This catalyst serves as a reaction medium for the reaction of the present invention. Trichloroethylene, or 2-bromo-1,1-dichloro-ethylene, is contacted with hydrogen-fluoride, at a temperature above 150 degrees centigrade and below that temperature at which considerable pyrolysis of the reaction mixture occurs, preferably at a temperature of 300 to 400 degrees centigrade, to yield a 1,1,1-trifluoro-2-haloethane compound having either fluorine, chlorine, or bromine on the number two carbon atom, depending on the starting material and the conditions of reaction. Normally, a mixture of products is obtained.

The ratio of hydrogen fluoride to the halo hydrocarbon starting material can be varied from 1–1, to 20–1, but the preferred range is from 4–1 to 8–1. A contact time from 1–100 seconds is operable, but a contact time from 2–10 seconds is preferred.

By following the process of the present invention, a novel compound is prepared, 1,1,1,2-tetrafluoroethane, having a boiling point of —29 degrees centigrade. This compound, with its low boiling point and high stability is useful as a refrigerant and particularly suitable for use as an aerosol propellant.

The following examples are given to illustrate the process of the present invention but are not to be construed as limiting.

*Example 1*

A mixture of 1920 grams (96 moles) of anhydrous hydrogen fluoride and 1666 grams (12.67 moles) of trichloroethylene was fed to a vaporizer heated to 350 degrees centigrade. The mixed gases from the vaporizer were then passed through a 2" x 30" metal tube container packed with 894 cubic centimeters (16 in.) bed of ⅛" pellet of an oxygenated chromium trifluoride catalyst prepared by burning chromium trifluoride trihydrate with oxygen at 600 degrees centigrade. This tube was heated by a 24" electric furnace, and the contact time for the gases passing through was 2.9 seconds. The reaction gases were then passed through a water scrubber to remove acidic constituents and then through a trap cooled to 0 degrees centigrade with ice. Thereafter, the gases were dried over calcium sulphate and condensed in a Dry Ice-acetone cooled trap followed by a liquid nitrogen cooled trap. Fractionation of the combined organic materials gave 1.7 grams (0.16 mole percent) of $CHF_2$—$CF_3$ (boiling point —50 degrees centigrade), 38.5 grams (3.0 moles percent) of $CH_2F$—$CF_3$ (boiling point —29 degrees centigrade), 1,179.6 grams (78.5 moles percent) of $CH_2Cl$—$CF_3$ (boiling point 6 degrees centigrade), 24.4 grams (1.7 moles percent) of $CHCl=CClF$ (boiling point 35 degrees centigrade) and 128.6 grams (7.7 moles percent) recovered trichloroethylene.

The 1,1,1,2-tetrafluoroethane (boiling point —29 degrees centigrade) is a very stable compound, and its structure has been proved by mass spectroscopy and because of its low toxicity has a high degree of utility as an aerosol propellant.

*Example 2*

In a manner similar to that of Example 1, 1616 grams (3.5 moles) of 1,1-dichloro-2-bromoethylene and 310 grams (15.5 moles) of hydrogen fluoride were passed over the basic chromium fluoride catalyst at a contact time of 2.7 seconds and a temperature of 300 degrees centigrade. There was thus obtained a mixture of reaction products of 11.3 mole percent of $CHF_2$—$CF_3$ (boiling at —51 degrees centigrade), 15.0 mole percent of $CH_2Cl$—$CF_3$ (boiling at 5 degrees centigrade) and 17.0 mole percent of $CH_2BrCF_3$ (boiling at 26 degrees centigrade). Other reaction products were also separated for an organic recovery of 61.6 percent of the $CHBr=CCl_2$ charged.

The ratio of products obtained from the reaction may be varied considerably, by varying the ratio of hydrogen fluoride to organic starting material, and also by varying the temperature. Thus, by increasing the amount of hydrogen fluoride in proportion to the organic starting material present, it is possible to obtain a greater percentage of higher fluorinated products, and by increasing the temperature, the amount of fluorination can also be increased.

Various modifications may be made in the process in the present invention without departing from the spirit and scope thereof, and it is to be understood that we limit ourselves only as defined in the appended claims.

We claim:

1. A process for forming a 1,1,1-trifluoro-2-haloethane which comprises: passing a mixture of hydrogen fluoride with a compound selected from the group consisting of trichloroethylene and 1,1-dichloro-2-bromoethylene into contact with a basic chromium fluoride catalyst for a time and at a temperature sufficient to convert at least a part of said mixture to a 1,1,1-trifluoro-2-haloethane compound.

2. A process for forming a 1,1,1-trifluoro-2-haloethane which comprises: passing a mixture of hydrogen fluoride with a compound selected from the group consisting of trichloroethylene and 1,1-dichloro-2-bromoethylene at a contact time between 1 and 100 seconds and at a temperature of at least 150 degrees centigrade into contact with a basic chromium fluoride catalyst, and, separating a 1,1,1-trifluoro-2-haloethane from the reaction mixture.

3. A process for forming a 1,1,1-trifluoro-2-haloethane which comprises: passing a mixture of hydrogen fluoride with a compound selected from the group consisting of trichloroethylene and 1,1-dichloro-2-bromoethylene at a contact time between 2 and 10 seconds and at a temperature between 300 and 400 degrees centigrade with a basic chromium fluoride catalyst, and separating a 1,1,1-trifluoro-2-haloethane from the reaction mixture.

4. A process for forming a 1,1,1-trifluoro-2-haloethane which comprises: passing a mixture of hydrogen fluoride with trichloroethylene into contact with a basic chromium fluoride catalyst for a time and at a temperature sufficient to convert at least a part of said trichloroethylene to a 1,1,1-trifluoro-2-haloethane.

5. A process for forming a 1,1,1-trifluoro-2-haloethane which comprises: passing a mixture of hydrogen fluoride with trichloroethylene for a contact between 1 and 100 seconds and at a temperature of at least 150 degrees centigrade into contact with a basic chromium fluoride catalyst, and, separating a 1,1,1-trifluoro-2-haloethane from the reaction mixture.

6. A process for forming a 1,1,1-trifluoro-2-haloethane which comprises: passing a mixture of hydrogen fluoride with trichloroethylene for a contact time between 2 and 10 seconds and at a temperature between 300 and 400 degrees centigrade into contact with a basic chromium fluoride catalyst, and, separating a 1,1,1-trifluoro-2-haloethane from the reaction mixture.

7. A process for forming a 1,1,1-trifluoro-2-haloethane which comprises: passing a mixture of hydrogen fluoride with 1,1-dichloro-2-bromoethylene for a contact time between 2 and 10 seconds and at a temperature between 300 and 400 degrees centigrade with a basic chromium fluoride catalyst, and, separating a 1,1,1-trifluoro-2-haloethane from the reaction mixture.

8. A process for forming a 1,1,1-trifluoro-2-haloethane which comprises: passing a mixture of hydrogen fluoride with 1,1-dichloro-2-bromoethylene at a contact time between 1 and 100 seconds and at a temperature of at least 150 degrees centigrade into contact with a basic chromium fluoride catalyst, and, separating a 1,1,1-trifluoro-2-haloethane from the reaction mixture.

9. A process for forming a 1,1,1-trifluoro-2-haloethane which comprises: passing a mixture of hydrogen fluoride with 1,1-dichloro-2-bromoethylene at a contact time between 2 and 10 seconds and at a temperature between 300 and 400 degrees centigrade into contact with a basic chromium fluoride catalyst, and, separating a 1,1,1-trifluoro-2-haloethane from the reaction mixture.

References Cited in the file of this patent

UNITED STATES PATENTS

| | | |
|---|---|---|
| 2,005,708 | Daudt et al. | June 18, 1935 |
| 2,399,024 | Harmon | Apr. 23, 1946 |
| 2,480,560 | Downing et al. | Aug. 30, 1949 |
| 2,745,886 | Ruh et al. | May 15, 1956 |

OTHER REFERENCES

Cuculo et al.: Jour. Amer. Chem. Soc., 74, 710–713 (page 710 only needed), February 5, 1952.

Luft: Jour. of Phys. Chem., 59, 92–93, January 1955